United States Patent
Lang et al.

(10) Patent No.: US 7,113,340 B2
(45) Date of Patent: Sep. 26, 2006

(54) OUTSIDE REAR VIEW MIRROR FOR COMMERCIAL VEHICLES

(75) Inventors: Heinrich Lang, Ergersheim (DE); Albrecht Popp, Weihenzell (DE)

(73) Assignee: Lang-Mekra North America, LLC, Ridgeway, SC (US)

(*) Notice: Subject to any disclaimer, the term of this patent is extended or adjusted under 35 U.S.C. 154(b) by 123 days.

(21) Appl. No.: 10/449,246

(22) Filed: May 30, 2003

(65) Prior Publication Data
US 2004/0051983 A1 Mar. 18, 2004

(30) Foreign Application Priority Data
Aug. 29, 2002 (EP) ............................................. 02019384

(51) Int. Cl.
*G02B 7/182* (2006.01)

(52) U.S. Cl. ......................... 359/599; 359/871; 359/872
(58) Field of Classification Search ................. 359/599, 359/871–877; 349/67
See application file for complete search history.

(56) References Cited

U.S. PATENT DOCUMENTS

| | | | |
|---|---|---|---|
| 1,430,379 A | 9/1922 | Hubbell | |
| 1,595,557 A | 8/1926 | Mamiya | |
| 2,458,117 A | 1/1949 | Tolbert | |
| 2,783,015 A | 2/1957 | Kampa | |
| 2,839,965 A | * 6/1958 | Budreck | 248/480 |
| 2,884,218 A | 4/1959 | Gilchrist | |
| 3,107,077 A | 10/1963 | Lassa | |
| 3,339,876 A | 9/1967 | Kampa | |
| 3,346,229 A | 10/1967 | Carson, Jr. | |
| 3,371,903 A | 3/1968 | Thompson | |
| 3,372,897 A | 3/1968 | Lee | |
| 3,384,334 A | 5/1968 | Malachowski | |
| 3,429,639 A | * 2/1969 | Peters | 359/877 |

(Continued)

FOREIGN PATENT DOCUMENTS

| | | | |
|---|---|---|---|
| CA | 1095008 | | 2/1981 |
| DE | 3614927 | | 11/1987 |
| DE | 3740485 | | 6/1989 |
| DE | G 9108483.0 | | 1/1992 |
| DE | G 9308052.2 | | 9/1993 |
| EP | 0220606 | | 10/1986 |
| EP | 0399401 | | 11/1990 |
| GB | 2193940 | | 2/1988 |
| JP | 62251255 | | 2/1987 |
| JP | 62-194952 | * | 8/1987 |
| WO | WO0047445 | | 8/2000 |

OTHER PUBLICATIONS

Search Report issued from the European Patent Office on Dec. 23, 2002 and English Translation thereof.
English language translation of EP 0220 606.
English language Abstract for DE 36 14 927 from (c) 2002 Derwent Info Ltd.
English language translation of DE 37 40 485.
English language translation of G 91 08 483.0.
English langauge translation of G 93 08 052.2.

*Primary Examiner*—Mark A. Robinson
(74) *Attorney, Agent, or Firm*—McNair Law Firm, P.A.

(57) ABSTRACT

A modular outside mirror assembly for a commercial vehicle incorporates an upper body anchorage, with an upper pivot linkage, a lower body anchorage with a lower pivot linkage, a first mirror and a holding arm, onto which the first mirror is fastened. The holding arm is disposed in the upper and lower pivot linkage of the upper and lower body anchorage such that the holding arm is rotatable about an axis relative to the body anchorages. Due to modular construction, a multiplicity of different mirror variants are available. In another aspect a servomotor is attached to the holding arm to pivot the holding arm against or away from a side of the vehicle about a defined turning axis.

8 Claims, 3 Drawing Sheets

U.S. PATENT DOCUMENTS

Figure 1:
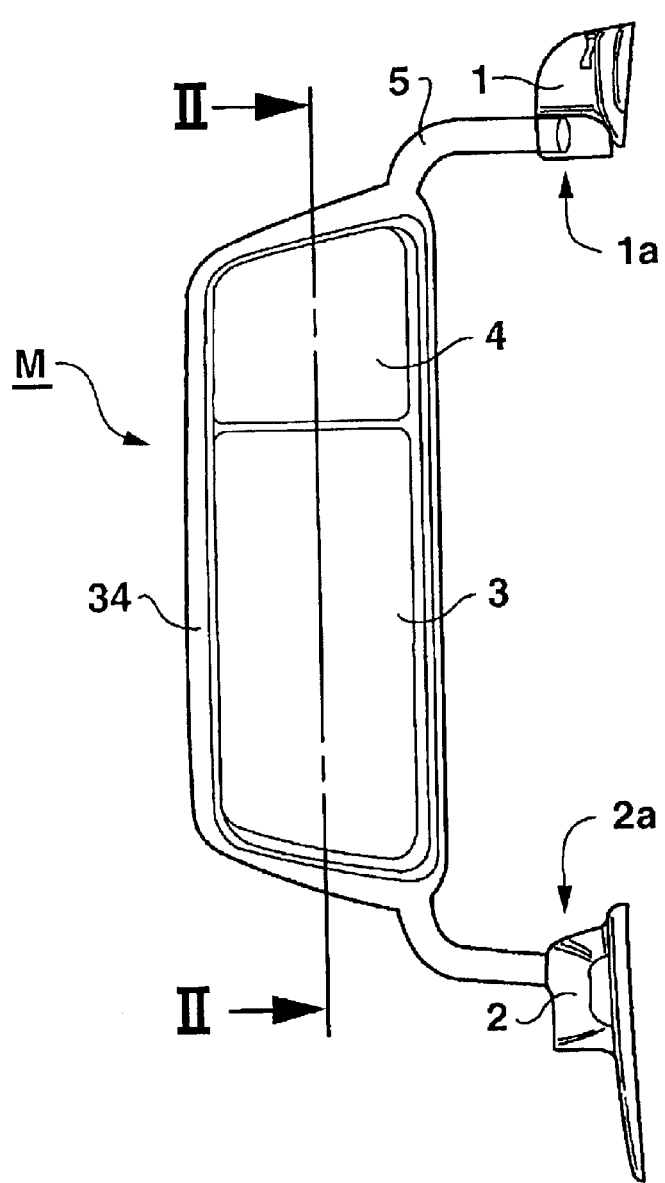

| | | |
|---|---|---|
| 3,476,464 A | 11/1969 | Clark |
| 3,624,818 A * | 11/1971 | Stanfield ...................... 359/878 |
| 3,637,186 A | 1/1972 | Grennfield |
| 3,671,005 A | 6/1972 | Schultz |
| 3,761,164 A | 9/1973 | McKee et al. |
| 3,784,149 A | 1/1974 | Brudy |
| 3,934,807 A * | 1/1976 | Boutin ........................ 248/478 |
| 3,969,952 A | 7/1976 | McKee et al. |
| 4,077,597 A | 3/1978 | Greig |
| 4,186,905 A | 2/1980 | Brudy |
| 4,218,036 A * | 8/1980 | Pitkanen ...................... 248/478 |
| 4,295,708 A * | 10/1981 | Albrecht et al. ............ 359/877 |
| 4,349,247 A | 9/1982 | Koyama et al. |
| 4,506,954 A | 3/1985 | Enomoto |
| 4,558,930 A * | 12/1985 | Deedreek .................... 359/841 |
| 4,609,265 A | 9/1986 | McKee et al. |
| 4,613,107 A | 9/1986 | Vitaloni |
| 4,692,000 A | 9/1987 | Wada et al. |
| 4,778,265 A | 10/1988 | Fingerle et al. |
| 4,784,011 A * | 11/1988 | Riley ........................ 74/502.1 |
| 4,919,526 A | 4/1990 | Umekawa et al. |
| 4,951,912 A | 8/1990 | Manzoni |
| 4,951,913 A | 8/1990 | Quesada |
| 4,991,814 A | 2/1991 | Schmidt et al. |
| D315,710 S | 3/1991 | Ropolo |
| 5,069,539 A | 12/1991 | Valde |
| 5,081,546 A | 1/1992 | Bottrill |
| 5,106,049 A | 4/1992 | Schmidt et al. |
| 5,107,374 A | 4/1992 | Lupo et al. |
| 5,120,015 A | 6/1992 | do Espirito Santo |
| 5,137,247 A | 8/1992 | Lang et al. |
| 5,172,884 A | 12/1992 | Ishiyama |
| 5,210,652 A | 5/1993 | Perkinson |
| 5,225,943 A * | 7/1993 | Lupo ........................... 359/841 |
| 5,337,190 A | 8/1994 | Kogita et al. |
| 5,375,014 A * | 12/1994 | Fujie et al. ................. 359/841 |
| 5,483,385 A | 1/1996 | Boddy |
| D370,882 S | 6/1996 | Schmidt et al. |
| 5,625,502 A | 4/1997 | Hoogenboom et al. |
| D385,243 S | 10/1997 | Lang |
| 5,721,646 A * | 2/1998 | Catlin et al. ................. 359/865 |
| 5,722,629 A | 3/1998 | Lang et al. |
| D407,361 S | 3/1999 | Lang |
| 5,880,895 A | 3/1999 | Lang et al. |
| D426,182 S | 6/2000 | Brown |
| 6,139,159 A * | 10/2000 | Whitehead .................. 359/841 |
| 6,286,968 B1 | 9/2001 | Sailer et al. |
| 6,302,549 B1 | 10/2001 | Branham et al. |
| 6,349,916 B1 | 2/2002 | Lang et al. |
| 6,361,178 B1 | 3/2002 | Lang et al. |

\* cited by examiner

OUTSIDE REAR VIEW MIRROR FOR COMMERCIAL VEHICLES

FIELD OF THE INVENTION

The present invention is directed to an outside rearview mirror for commercial vehicles.

BACKGROUND OF THE INVENTION

Commercial vehicles such as trucks, travel buses and the like, each possess on their driver's side, as well as on the passenger's side, at least one outside main mirror and very frequently a wide-angle mirror. Since the commercial vehicle, in accord with the laws of various lands, can be steered from the right or left, the mirror manufacturer must make four different mirrors available, i.e., for driver side and passenger side and for right steering and left steering. This obligation leads to high manufacturing costs for the different forms and associated equipment as well as to high costs of inventory for multiple versions.

Often variants of the same mirror (for example the driver's side mirror for a left-steering vehicle) are offered, each being expensive initially, but on the basis of being aerodynamically favorable, in the long run, promising to be more economical. The known variants require different fastening apparatuses, mirror panes, adjustment devices and the like, all of which must be designed, manufactured and held in inventory. This again presents a substantial factor in cost accumulation. Furthermore, the commercial vehicle itself must be subjected to various attachment modes, including borings and the like.

Further, outside mirrors for commercial vehicles, to achieve the desired angle of sight, are installed normally on the side and/or somewhat forward on the body of the commercial vehicles. However, in many cases this is disadvantageous when driving, for example, through narrow washing lanes or during transport of the commercial vehicles on ferries or transport ships, where the vehicles are placed as closely as possible beside each other and nose to tail with one another.

Again, upon maneuvering in tight areas such as entries to courts, street tunnels and the like, the side and forward positions of the rear view mirrors can be inconvenient. To correct this, the outside rear view mirrors should be pivoted, so that they can be swung back against the side of the vehicle. To carry this swinging out manually would be disadvantageous, as the pivoting would also be necessary for the passenger seat mirror which is not directly reachable by the driver.

BRIEF SUMMARY OF THE INVENTION

In accord with the present invention, an outside rearview mirror assembly for a commercial vehicle is constructed modularly and encompasses an upper and a lower body anchorage, each of which possesses a pivotable connecting linkage. The body anchorages can be mounted on a door of the commercial vehicle.

Additionally, the outside rearview mirror assembly comprises at least a first mirror, known as the principal mirror. The mirror construction can also include a second mirror, for instance, a wide-angle mirror. The assembly of each mirror can include a mirror pane and a positioning adjustment device for the pane.

Further, the invented mirror assembly has a holding arm, onto which the first and second mirrors are fastened via their adjustment device. The holding arm is pivotally set in the respective upper and lower body anchorages, so that it is swingable about an axis relative to the body anchorages.

Different embodiments of the holding arms can be employed in the invented outside rear view mirror construction. For example, the holding arm can be fabricated as an integral molded part in which the positioning device is incorporated. In like manner, the holding arm can be comprised of a tubular yoke onto which the positioning device is affixed. The first and second mirrors can, in such a case, be incorporated into a common housing in an individually separate manner, each with its own cover plates or, alternately, be affixed together to a tubular yoke in a common housing.

Employing modular construction, the outside rearview mirror assembly will make use of the same upper and lower body anchorages and have the same first and second mirrors. Any difference will lie only in the shaping of the holding arms; therefore, it is possible, with a relatively small number of elements, to make available a multiplicity of variations for outside mirrors. For example, a holding arm in the form of a tubular yoke can be effectively used on the driver's side as well as on the passenger's side. Likewise a first and a second mirror in a common housing or in separate housings can be placed on both sides of the driver's cab. In this way, with very few components, a variety of modular outside mirrors can be installed. These mirrors may be on either the driver's side or the passenger's side, adapted for left or right steering, and optimized from both aerodynamic and economic standpoints.

In one aspect of the invention the pivoting of an outside mirror for a commercial vehicle involves at least one first (upper) body anchorage, which possesses at least a first (upper) pivotable linkage and at least one first mirror. This mirror can include a mirror pane and an adjustment therefor, and one holding arm on which this first mirror is fastened via its positioning device. With this arrangement a positioning device is available, which is enhanced by a servomotor. The servomotor attaches the positioning device to the holding arm. The holding arm, now powered by the servomotor, can be pivoted outward and inward relative to the side of the vehicle via the first pivotable linkage.

In an advantageous manner, an invented outside mirror assembly also possesses a second (lower) body anchorage with a second (lower) pivotable linkage in which the holder is additionally secured. In this case, the positioning device can rotate the holding arm about the axis of rotation defined by the first and the second pivotable linkages.

In an advantageous embodiment, the positioning device encompasses a linear drive with a slide-rod, which is linkedly affixed to the holding arm and can be pushed or retracted by the servomotor in such a manner, that the holding arm pivots accordingly against or away from the vehicle side.

In another advantageous embodiment the positioning device has a rotational drive, which acts upon either the upper or the lower holding arm to pivot the arm against or away from the vehicle side.

In an advantageous way, the positioning device can be integrated into the outside mirror assembly. The servomotor may be placed in a holding arm or in a body anchorage.

In another embodiment in accord with the invention, the positioning device has a forward and a back limit switch, which confines the pivoting movement of the holding arm within a defined extended or retracted end position.

Figure 2:
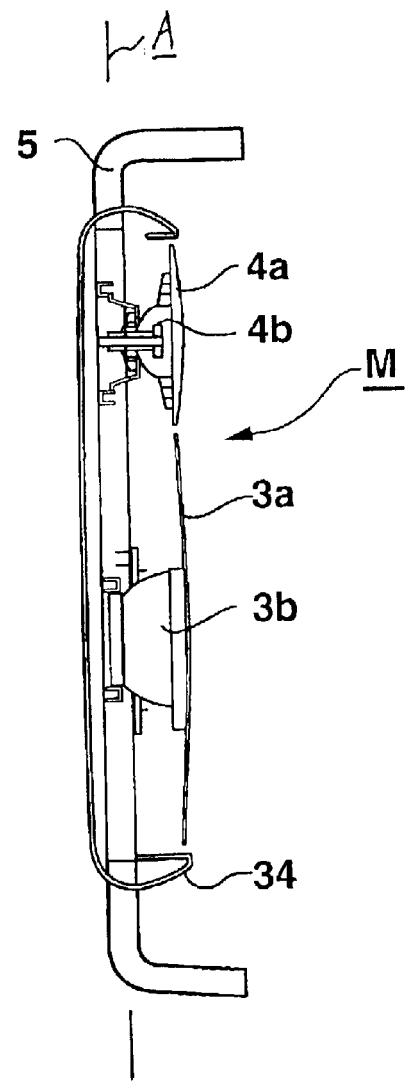
Figure 3:
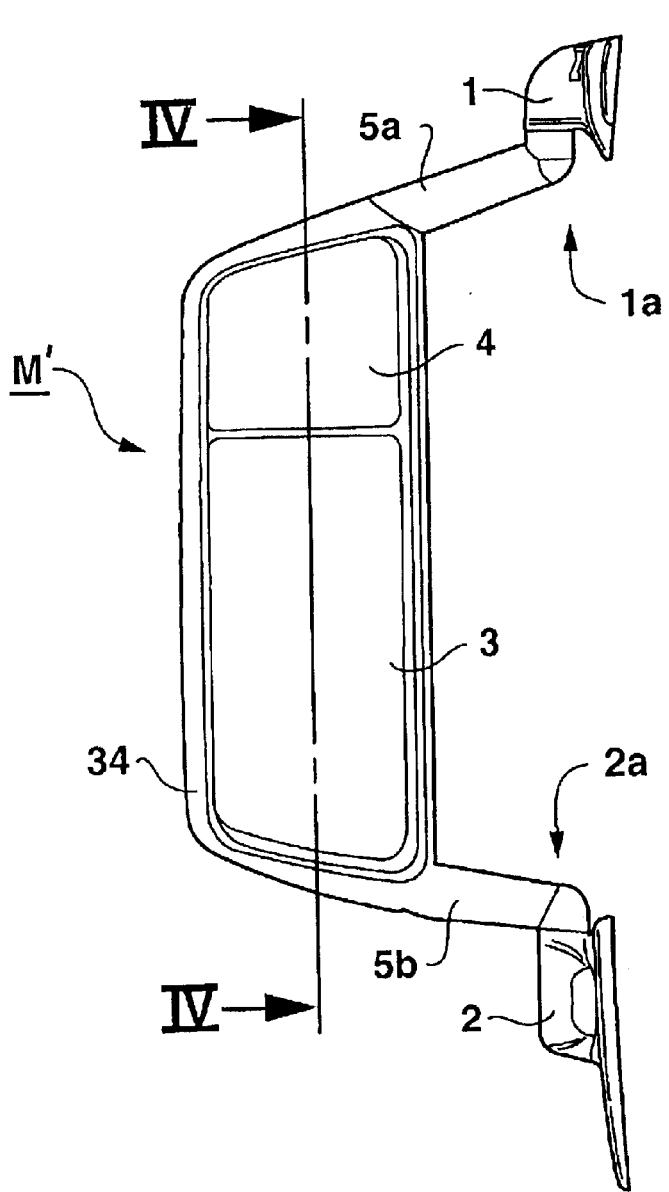
Figure 4:
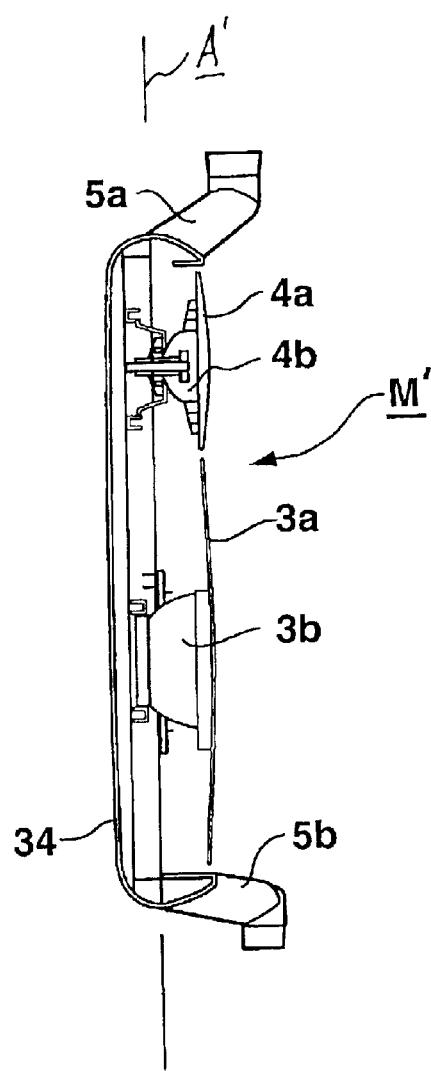
Figure 5:
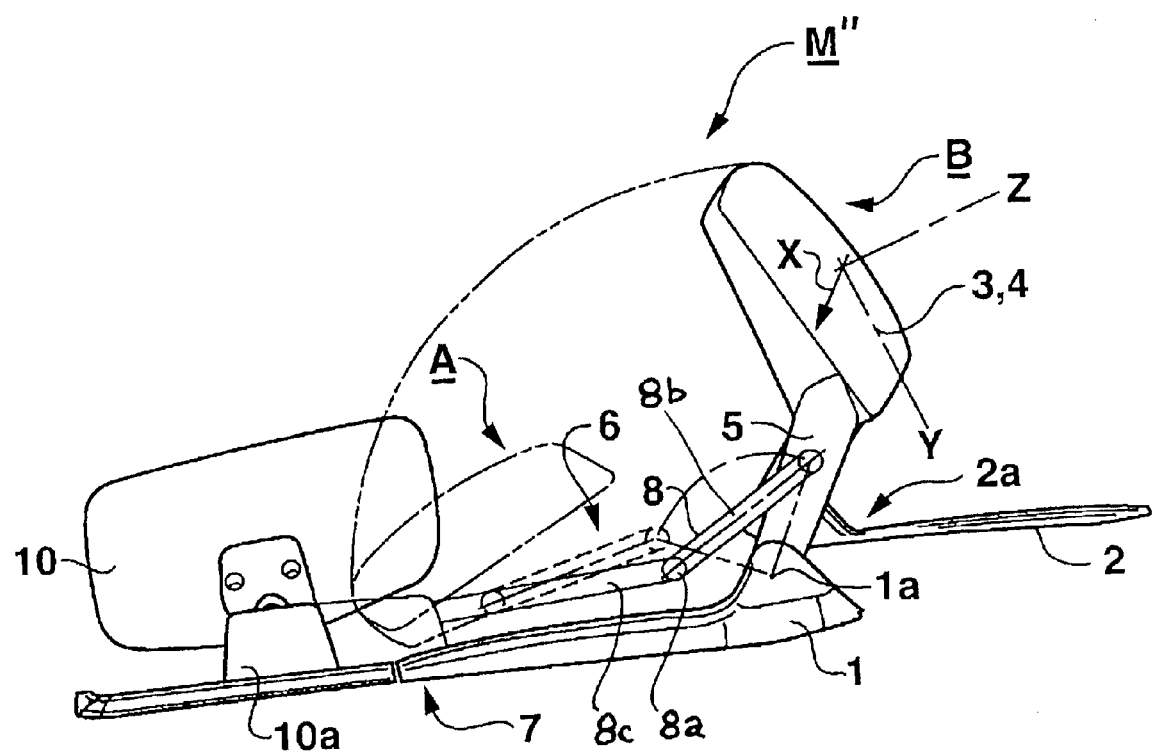

Further advantages, features and embodiments of the present invention are evident in the following detailed description in combination with the drawings in which:

FIG. 1:—is a front elevational view of an outside mirror assembly for a commercial vehicle in accord with a first embodiment of the present invention;

FIG. 2:—is a sectional view of the mirror assembly as in FIG. 1 taken along the line II—II;

FIG. 3:—is a front elevational view of an outside mirror assembly for a commercial vehicle in accord with a second embodiment of the present invention;

FIG. 4:—is a sectional view of the mirror assembly as in FIG. 3 taken along the line IV—IV; and FIG. 5:—is a top plan view of an outside mirror assembly for a commercial vehicle in accord with a third embodiment of the present invention.

DETAILED DESCRIPTION OF THE DRAWINGS

Detailed reference will now be made to the drawings in which examples embodying the present invention are shown. The drawings and detailed description provide a full and detailed written description of the invention, and of the manner and process of making and using it, so as to enable one skilled in the pertinent art to make and use it, as well as the best mode for carrying out the invention. However, the examples set forth in the drawings and detailed description are provided by way of explanation of the invention and are not meant as limitations of the invention. The present invention thus includes any modifications and variations of the following examples as come within the scope of the appended claims and their equivalents.

The detailed description uses numerical and letter designations to refer to features in the drawings. Like or similar designations in the drawings and description have been used to refer to like or similar parts of the invention.

FIG. 1 shows an outside mirror assembly M for a commercial vehicle (not shown) in accord with a first embodiment of the present invention. The outside mirror assembly encompasses an upper body anchorage 1 and a lower body anchorage 2, which is affixed on a vehicle door (not shown). In this aspect, a pivotable linkage, respectively 1a, 2a, is indicated without detail. Further, the mirror assembly includes a first mirror (main mirror) 3 and a second mirror (wide-angle mirror) 4, which comprise respectively a mirror pane 3a, 4a and a positioning device 3b, 4b as may be seen in FIG. 2. The first and second mirrors 3, 4 are in a common housing 34 along with their respective positioning devices 3b, 4b. The positioning devices 3b, 4b, can be in accord with the state of the technology, either manually or electrically adjusted.

Also in this aspect of the invention, the mirror assembly has a holding arm 5, on which the main mirror 3 and the wide-angle mirror are affixed via their positioning devices 3b, 4b. The holding arm 5 itself, in the form of a tubular yoke, is fastened to the upper and lower body anchorages 1, 2 in such a manner that it can pivot in the upper and lower pivot linkage 1a, 2a about an essentially vertical axis A. In this way, the holding arm can be swung against and away from the side of the vehicle.

The common housing 34 for the first and second mirrors 3, 4 is fastened on the holding arm 5 via the positioning device 3b, 4b.

FIGS. 3, 4 show an outside mirror assembly M' for a commercial vehicle in accord with a second mode of construction of the present invention. In this aspect of the invention, the holding arm 5 is built of two parts i.e., an upper part 5a and a lower part 5b. Accordingly, the upper and lower parts 5a, 5b are respectively connected with the common housing 34 at its upper and lower ends via an upper and lower pivot linkage 1a, 2a and pivot about an axis A'.

Common to the foregoing embodiments is the modular construction of the upper and lower body anchorages 1, 2 as well as the first and second mirrors 3, 4 including their positioning devices 3b, 3a and the common housing 34. These elements are the same for varying embodiments to reduce manufacturing and inventory costs. Utilizing different holding arms, such as those in the first and second embodiments, permits modular mirror variants and if necessary, parts can be subsequently exchanged. For example, the common housing 34 is symmetrically constructed relative to its transverse axis. In this way, the same housing 34 can be employed both for a left as well as a right outside mirror. This is possible because the housing 34 is rotated 180° about an axis normal to its longitudinal and transverse axes. After rotation, the housing 34 is affixed to the tubular yokes of the first embodiment or at the upper and lower part 5a, 5b of the holder of the second embodiment. The first and second mirrors 3, 4 are correspondingly placed in the housing 34.

In this way, the upper and lower body anchorage 1,2 can be immediately and preliminarily attached to the body of the commercial vehicle, independent of any alignment of the mirror M or M' which may be desired later. Thus, both the planning of the mounting of the mirror M or M' and the fastening on the vehicle is essentially simplified. Mirrors, including the mirror panes and the positioning devices can be uniformly made for all mirror variants, which is an advantage that clearly lowers the cost of production.

FIG. 5 depicts an outside mirror assembly M" for a commercial vehicle in accord with a third embodiment of the present invention in a top view showing an outward extended holding arm 5 (shown in solid lines) and an inward pivoted holding arm 5 (shown in dotted lines). This holding arm 5 is pivotally retained in the upper body anchorage 1 and in the lower body anchorage 2 respectively in the pivot linkages 1a, 2a. A first and a second mirror 3, 4 are integrally fastened onto the holding arm 5.

Additionally the mirror assembly M" incorporates a loading dock ramp mirror 10 on the upper body anchorage 1, which is affixed thereto via a positioning device 10a. In this positioning device 10a is placed a servomotor 7. The servomotor 7 and the positioning device 10a can be integrally constructed as a unit. This servomotor 7, which can be an electrical rotational or linear motor, extends (and retracts) the linear drive (not shown) and a push rod or slide-rod 8, which is linkedly fastened to the holding arm 5. The servomotor 7, linear drive and the slide-rod 8 together form a positioning device 6. The positioning device 6 transforms the rotation of a rotating motor into a linear motion via the linear drive. If the motor is a linear acting motor, then the linear drive may be omitted.

If the slide-rod 8 is moved via the servomotor 7, then the holding arm 5, in accordance with the operating direction of the servomotor 7, is pivoted inward or outward relative to the vehicle side. In this way, the kinematics of the linear drive and the slide-rod 8 are so configured that the holding arm 5 can be pivoted to a first end position A proximate the vehicle side in which the slide-rod 8 is shown compacted, or to a second end position B away from the side of the vehicle in which the slide-rod 8 is extended. In this exemplary arrangement, the slide-rod 8 includes a pivot point 8a disposed between two arms 8b, 8c. However, a variety of pivot points and arms can be provided within the scope of the invention. For example, the pivot point 8a can be appropriately positioned along any part of the arms 8b, 8c (i.e., arms 8b, 8c may be different lengths), or on the holding arm 5, or one or more of the arms 8b, 8c can be telescoping, collapsible or foldable.

The servomotor 7 is, for example, controlled via a service position on an instrument board (not shown) of the commercial vehicle. Accordingly, the holding arm 5 can be pivoted into the outward extended position B or the retracted position A and intermediate position therebetween. This arrangement makes it possible for the driver to operate the outside mirror inward or outward, while remaining in the driver's seat. This arrangement serves not only for the in/out pivoting of the passenger side mirror, but also for the in/out pivoting of the driver's side mirror, even in the case of closed windows and without any manual intervention.

In a further embodiment, not shown here, the servomotor 7 is not in the positioning device 10a of a ramp mirror 10, but rather fastened directly on the body anchorage 1. Such an embodiment advantageously allows the subsequent replacement of an available, pivotable outside mirror with an invented positioning device.

In a further embodiment, also not depicted here, an invented outside mirror assembly possesses only one first (upper) body anchorage 1 functioning with the first (upper) pivotal linkage 1a in which the holder 5 is mounted to be pivotally turnable about at least one axis.

It will be apparent to those skilled in the art that various modifications and variations can be made in the present invention without departing from the scope and spirit of the invention. For example, specific shapes of various elements of the illustrated embodiments may be altered to suit particular applications. It is intended that the present invention include such modifications and variations as come within the scope of the appended claims and their equivalents.

What is claimed is:

1. A mirro assembly for a vehicle comprising:
   an anchorage including pivot linkage;
   a holding arm carried by said pivot linkage and movable between extended and retracted position;
   a first housing, carrying a first mirror pane, secure with said holding arm;
   a second housing including a dock ramp mirror and a servomotor, carried by said anchorage in spaced fixed position from said pivot linkage and said holding arm;
   linkage connected to said holding arm and said servomotor, said linkage enabling said servomotor to pivot said holding arm between said extended and retracted positions without effecting the position of said second housing and dock ramp mirror.

2. The mirror assembly as in claim 1, further comprising a second body anchorage having a second pivot linkage in which the holding arm is seated.

3. The mirror assembly of claim 1, wherein the first housing carries a first positioning device which mounts the mirror pane, said positioning device being operative to position the mirror pane within the first housing.

4. The mirror assembly of claim 1, wherein the servomotor is selected from the group consisting of a rotational motor, and a linear motor.

5. The mirror assembly of claim 1, wherein said linkage includes a slide-rod, connected with the holding arm and actuated by the servomotor.

6. The mirror assembly of claim 1 wherein said holding arm comprises a tubular yoke with a linear section, said first housing being mounted on said linear section.

7. The mirror assembly to claim 1 wherein said holding arm comprises a multi-part component with individual components engaging with said first housing.

8. The mirror assembly of claim 1 wherein said linkage is longitudinally movable.

\* \* \* \* \*